(12) United States Patent
Uno

(10) Patent No.: US 6,275,521 B1
(45) Date of Patent: Aug. 14, 2001

(54) DEMODULATING APPARATUS AND DEMODULATING METHOD

(75) Inventor: Masahiro Uno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/274,362

(22) Filed: Mar. 23, 1999

(30) Foreign Application Priority Data

Mar. 26, 1998 (JP) .................................................. 10-079892

(51) Int. Cl.[7] .................................................... H04J 13/04
(52) U.S. Cl. .......................... 375/150; 375/152; 370/342; 370/479
(58) Field of Search ..................................... 375/130, 140, 375/147, 150, 152; 370/342, 335, 479

(56) References Cited

U.S. PATENT DOCUMENTS 5,949,816 * 9/1999 Okamoto .............................. 375/208
5,982,763 * 11/1999 Sato ..................................... 370/342

\* cited by examiner

*Primary Examiner*—Amanda T. Le
(74) *Attorney, Agent, or Firm*—Jay H. Maioli

(57) ABSTRACT

A demodulating apparatus that can reduce power consumption significantly compare to conventional cellular phones without the reception quality being degraded. Delay profile measuring is provided in which the delay profile (S41) of the baseband signal is measured while changing the measuring time for measuring the delay profile of the baseband signal, so that the measuring time can be held down to a minimum while avoiding the degradation of the reception power level. Therefore, power consumption can be significantly reduced compared to conventional cellular phones without reception quality being degraded.

18 Claims, 8 Drawing Sheets

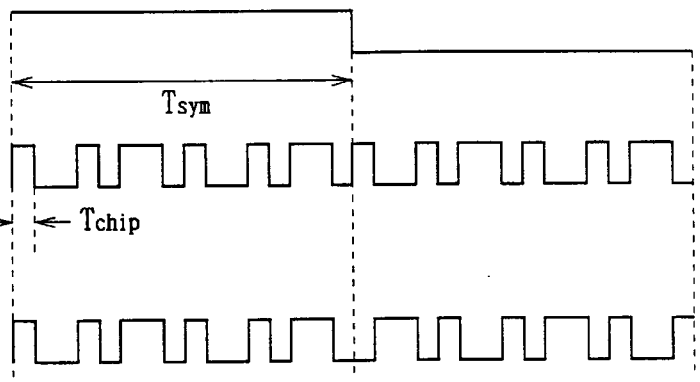
FIG. 1A (RELATED ART)
FIG. 1B (RELATED ART)
FIG. 1C (RELATED ART)
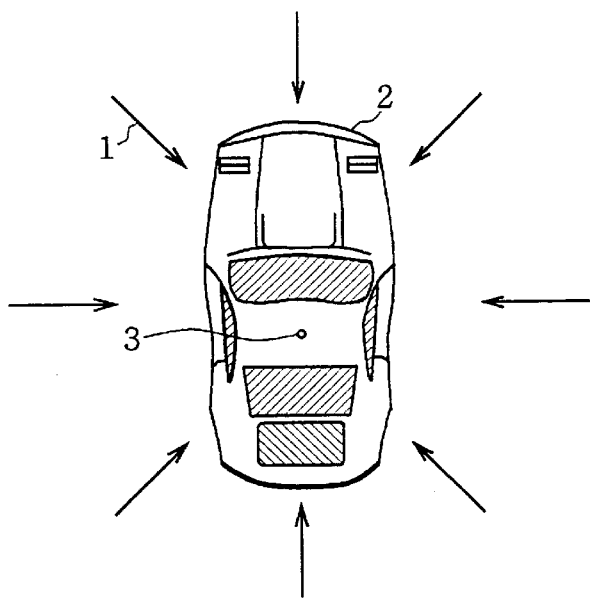
FIG. 2 (RELATED ART)

DEMODULATING APPARATUS AND DEMODULATING METHOD

BACKGROUND OF THE INVENTION

1. Field of the Invention

This invention relates to a demodulating apparatus and a demodulating method, and more particularly, is applicable to a portable telephone.

2. Description of the Related Art

There exists a portable telephone as a mobile communication system which has spread remarkably. Various communication methods of the portable telephone have been proposed. The typical one is the code division multiple access (CDMA) method. The CDMA method has been proposed and put to practical use as the IS-95 (Interim Standard-95) Standards in the U.S. Recently, in the standardization project of the next generation mobile communication system called IMT2000 (International Mobile Telecommunication 2000) which is being carried out by the International Telecommunication Union (ITU), the CDMA method is also watched as a strong communication method in the next generation.

The CDMA method is a communication method using so-called spread spectrum communication method, in which at a transmitting side, a code sequence to be transmitted is multiplied by a spread code sequence having higher speed than that of the code sequence to be transmitted so as to spread the code sequence, and at a receiving side, the code sequence is inversely spread by using the same spread code sequence as the spread code sequence used at the transmission. The maximum period code sequence is generally used as the spread code sequence. The maximum period code sequence is a code sequence having the characteristics that a correlation between different codes is independent and the auto-correlation function is like impulse. Therefore, at the receiving side, the received code sequence can not be demodulated if it is not multiplied by the same spread code sequence as that of the transmitting side and having the same timing as that of the transmitting side. Thus, the CDMA method is a superior communication method in a confidentiality since the transmitted contents are difficult to be heard by a third party. Moreover, the CDMA method assigns a different spread code sequence for each mobile station, so that an interference problem will not occur even if the same frequency is used.

Hereinafter, the principle of the spread spectrum will be explained. "$s_i$" denotes a transmission signal here. The transmission signal $s_i$ is a signal sequence of the complex number comprising a symbol length $T_{sym}$. "$c_j$" denotes a spread code. The spread code $c_j$ is a signal sequence of the complex number comprising a tip length $T_{chip}$. "j" denotes a time series symbol number and the maximum value is "J". The spread code $c_j$ is the maximum period code sequence having the period $J_{MAX}$, and the auto-correlation is like impulse. That is, the auto-correlation is obtained by the following equation (1):

$$\sum_{j=0}^{J} c_j c^*_{(j+k)\%JMAX} = \delta(k) = \begin{cases} A & (k=0) \\ 0 & (k \neq 0) \end{cases} \quad (1)$$

Note that "c*" denotes the conjugate of c and "%" denotes a residue arithmetic.

Further, the spread code $c_j$ is independent of the spread code $c_j'$ having the same period $J_{MAX}$ as that of the spread code $c_j$. This is indicated by the following equation (2):

$$\sum_{j=0}^{J} c_j c'^*_{(j+k)\%JMAX} = 0 \quad (2)$$

At the transmitting side, the spreading of the transmission signal si which is performed by using the spread code $c_j$ is indicated by the following equation (3):

$$x(iT_{sym}+jT_{chip})=s_i c_i \quad (3)$$

In this case, as shown in FIGS. 1A to 1C, because the symbol length $T_{sym}$ (FIG. 1A) of the transmission signal $s_i$ is extremely longer than the tip length $T_{chip}$ (FIG. 1B) of the spread code $c_j$, the spread transmission signal $x_j$ is spread into a very wide area comparing to the original transmission signal $s_i$ (FIG. 1C).

On the contrary, at the receiving side, by using the spread code sequence which is the same code sequence as that of the transmitting side and has the same timing, the received code sequence is inversely spread by the following equation (4):

$$y(iT_{sym}) = \sum_{j=1}^{J} x(iT_{sym} + jT_{chip})c^*_j \quad (4)$$

$$= s_i \sum_{j=1}^{J} c_j c^*_j = A\theta_i$$

and the transmission signal $s_i$ is demodulated. If the timing of the spread codes generated at the recording side deviates, the receiving side performs the inverse spreading by the following equation (5):

$$y(iT_{sym}) = \sum_{j=1}^{J} x(iT_{sym} + jT_{chip})c^*_j \quad (5)$$

$$= s_i \sum_{j=1}^{J} c_j + kc^*_j = 0$$

and the transmission signal $s_i$ can not be demodulated. In this way, in the spread spectrum communication, the inversely spread codes which has the same code sequence as the code sequence used at the transmission side and has the same timing is convoluted into a reception signal, so as to demodulate th e reception signal.

In the portable telephone, the multipath fading where the reception level changes moment by moment occurs. Hereinafter, the multipath fading will be explained with referring to FIG. 2 and FIG. 3. An electric wave from a base station is reflected and diffracted by the buildings and then is transmitted as plural scattered waves. The portable telephone receives the plural scattered waves transmitted through respective transmission paths. For example, as shown in FIG. 2, the plural scattered waves 1 are received by an antenna 3 of an automobile 2 which has a portable telephone. The portable telephone then combines these plural scattered waves and demodulates them.

The transmission paths of the scattered waves respectively have the different transmission time so that the transmission characteristics respectively have a predetermined frequency response. This produces the linear distortion called inter-code interference in the reception signal. The inter-code interference is a phenomenon that occurs when at the receiving timing of a predetermined symbol, the influence of symbols before and after the symbol is added in accordance with the impulse response of the transmission path, so that a code decision error increases. Generally, the code decision error remarkably increases when the delay time τ of each scattered wave is the same degree and over as the tip length $T_{chip}$ of the spread code. Such transmission path of the scattered wave is indicated by the following equation (6):

$$h(t) = a_1\delta(t-\tau_1) + a_2\delta(t-\tau_2) + a_3\delta(t-\tau_3)\ldots \quad (6)$$

$$= \sum_{n=1}^{N} a_n\delta(t-\tau_n)$$

Note that "N" is the number of the scattered waves, "$a_n$" is the complex gain showing the attenuated amount of each scattered wave and the phase rotation, and "$\tau_n$" is the delay time of each scattered wave. These values of N, $a_n$, and $\tau_n$ change at random. Thereby, the linear distortion also changes moment by moment.

As a receiving apparatus for compensating the linear strain caused by the multipath fading, there is a RAKE receiver. The RAKE receiver divides the multiwaves due to the multipath fading for each transmission path to generate plural scattered waves, and inversely spreads each of the scattered waves to combine them, thereby decreasing the linear distortion. Hereinafter, the RAKE receiver will be explained with referring to FIG. 3.

The RAKE receiver 10 inputs a reception signal S1 received by an antenna 11 to a high frequency amplifier 12. The high frequency amplifier 12 amplifies the reception signal S1 and outputs the resultant high frequency signal S2 to a frequency converter 13. The frequency converter 13 frequency-converts the high frequency signal S2 and outputs the resultant intermediate frequency signal S3 to an intermediate frequency amplifier 14. The intermediate frequency amplifier 14 amplifies the intermediate frequency signal S3 and outputs the intermediate frequency signal S4 to a filter 15. The filter 15 removes out-of-band unnecessary components or noise from the intermediate frequency signal S4 and outputs the resultant intermediate frequency signal S5 to an orthogonal detector 16.

The orthogonal detector 16 demodulates the intermediate frequency signal S5 based on the demodulation method of the orthogonal detecting method and outputs the resultant baseband signal S6 to a demodulator 17. The demodulator 17 inversely spreads the baseband signal S6 to generate demodulated data S7 and outputs this to an error correcting circuit 18. The error correcting circuit 18 error-corrects the demodulated data S7 and outputs the resultant demodulated data S8 to an audio decoder 19. The audio decoder 19 performs a predetermined demodulation processing on the demodulated data S8 and outputs the resultant audio signal S9 to an exterior through a speaker 20.

Here, the constitution of the demodulator 17 will be explained concretely with reference to FIG. 4. The demodulator 17 inputs the baseband signal S6 output from the orthogonal detector 18 to an analog-to-digital converter 30. The analog-to-digital converter 30 analog-to-digital converts the baseband signal S6 and outputs the resultant reception data S20 to a delay profile measuring circuit 31 and an inversely spread circuits 32A to 32C.

The delay profile measuring circuit 31 is generally called a matched filter and uses a finite impulse response (FIR) filter which is a digital filter. As shown in FIG. 5, the delay profile measuring circuit 31 is composed of a delay circuit 31A comprising a plurality of delay devices, a multiplying circuit 31B comprising a plurality of multipliers corresponding to the delay devices, and a combining circuit 31C for combining the multiplied results output from the multiplying circuit 31B. Reception data S20 comprising a bit sequence is input to the delay circuit 31A. the delay circuit 31A successively shifts the bits of the reception data S20 and outputs them to the multiplying circuit 31B.

The multiplying circuit 31B multiplies the bits output from the delay circuit 31A by the codes respectively set in the multipliers constituting the multiplying circuit 31B, and outputs the multiplied results to the combining circuit 31C. The combining circuit 31C combines the multiplied results output from the multipliers of the multiplying circuit 31B to obtain the correlation value. In this way, the delay profile measuring circuit 31 inversely spreads each scattered wave included in the reception data S20 one by one and measures the power level, so as to generate the delay profile S21 showing the power level distribution of each scattered wave to the delay time, to output this to an assigning circuit 32.

The assigning circuit 32 selects the scattered wave one by one from the scattered wave having the highest power level among a plurality of scattered waves based on the measured delay profile S21, and outputs timing signals S22A to S22C showing the reception timings of the selected scattered waves to corresponding inversely spread circuits 32A to 32C.

For example, as shown in FIG. 6, the delay profile measuring circuit 31 produces the delay profile S21 showing the distribution of the power level of scattered waves to the delay times $\tau_1$ to $\tau_7$. Since the delay profile S21 is determined by topography, streets, and so on, it is constant between several tens milliseconds and several seconds. The assigning circuit 32 selects the scattered waves of the delay times $\tau_3, \tau_4, \tau_5$ among the scattered waves of the delay times $\tau_1$ to $\tau_7$ based on the delay profile S21 to generate the timing signals S22A to S22C representing the reception timings.

The inversely spread circuit 32A generates a pseudo-noise code of a timing based on the timing signal S22A and inversely spreads the reception data S20 by using the pseudo-noise code. Thereby, the inversely spread circuit 32A inversely spreads only the scattered wave based on the instruction of the assigning circuit 32 among a plurality of scattered waves, and outputs the resultant inversely spread data S23A to the combining circuit 33.

Similarly, the inversely spread circuits 32B and 32C respectively generate pseudo-noise codes having a timing based on the timing signals S22B and S22C and inversely spread the reception data S20 by using the pseudo-noise codes generated. Thereby, the inversely spread circuits 32B and 32C inversely spread only the sca ttered wave based on the instruction of the assigning circuit 32 among a plurality of scattered waves, and output the resultant inversely spread data S23B and S23C to the combining circuit 33.

The combining circuit 33 synchronizes the timings of the inversely spread data S23A to S23C, and then combines the inversely spread data S23A to S23C by the maximum ratio combining method to output the resultant combined data S24 to a code demodulating circuit 34. The code demodulating circuit 34 demodulates the combined data S24 based on a predetermined demodulating method, and outputs the resultant demodulated data S7 to the error correcting circuit 18 (FIG. 3) at a later stage.

As described above, the demodulator 17 divides the baseband signal S6 into scattered waves different from each other in the delay time to inversely spread them, and then combines them again with the delay time and phase being matched. This suppresses the generation of the linear distortion. More specifically, the reception signal y(t) is obtained from the above described equation (6) by the following equation (7):

$$y(t) = h(t) * x(t) = \sum_{n=1}^{N} a_n \delta(t - \tau_n) * x(t) \qquad (7)$$

Note that "*" denotes the convolution arithmetic. However, the reception signal y(t) is not inversely spread if the inversely spread sequence and the timing are not matched. Then, the demodulating circuit 17 respectively inversely spreads the scattered waves different from each other in the delay time, compensates the phase of the complex gain $a_n$, and matches the timing of the inversely spread output so as to combine the reception signal y(t). As shown in the following equation (8):

$$y'(t) = \sum_{n=1}^{M} a_n \frac{a_n^*}{|a_n|} x(t) \qquad (8)$$

the combined signal y'(t) suppresses the linear distortion. In this connection, in the demodulating circuit 17, since the number of the inversely spread circuits 32A to 32C which can be provided is limited, the inversely spreading can not be performed on all of the scattered waves.

In the delay profile measuring circuit 31 described above, the period of the measuring time is generally determined by the observation value of the delay profile based on the communication system or topography. Normally, if it is set to several tens microseconds, the delay profile may be measured widely from a city area through a mountainous area. Therefore, the delay profile measuring circuit 31 widely sets the measuring time so as to measure the delay profile in any situation.

However, the period of time where the delay profile distributes is determined by topography or buildings. For instance, it is known that the delay profile in a city area has a relatively small extent. If the measuring time of the delay profile is set widely and fixed as the delay profile measuring circuit 31, the measurement is performed in the period of time wider than it is needed regardless of the delay time of the scattered wave. Accordingly, the measuring time becomes long and the power consumption of the delay profile measuring circuit 31 becomes large.

To use the portable telephone operated by a battery for a long time, it is necessary to reduce the power consumption of the portable telephone. Since the delay profile measuring circuit 31 is driven even in a waiting time, if the power consumption of the delay profile measuring circuit 31 can be reduced, the power consumption of the entire portable telephone can be reduced. In the delay profile measuring circuit 31, there arises a problem that the power consumption increases when the measuring time becomes longer than it is needed, since the power consumption is desired to be reduced.

SUMMARY OF THE INVENTION

In view of the foregoing, and the object of this invention is to provide a demodulating apparatus and demodulating method which can reduce the power consumption significantly comparing to a conventional one without the degradation of the reception quality.

The foregoing object and other objects of the invention have been achieved by the provision of a demodulating apparatus, which has a plurality of inversely spread circuits, for inversely spreading baseband signals which are spread-spectrum-modulated and transmitted by pseudo-noise codes of different timing in accordance with a plurality of inversely spread circuits, thereafter for combining the output from a plurality of inversely spread circuits, comprises: delay profile measuring means for measuring the delay profile of the baseband signal, while changing the measuring time for measuring the delay profile representing the power level of the plural scattered waves which are received at different delay time, the delay profile being included in the baseband signal; and assigning means for selecting a desired number of scattered waves among from the plural scattered waves included in the baseband signal based on the delay profile measured by the delay profile measuring means, and for assigning respective reception timings of the selected scattered waves to corresponding plural inversely spread circuits so as to determine the timing of generating the pseudo-noise codes.

While changing the measuring time for measuring the delay profile of the baseband signal, the delay profile of the baseband signal is measured, so that the measuring time can be held down to the minimum time it is needed, with the degradation of the reception power level being avoided.

Further, according to this invention, a demodulating method by a demodulating apparatus, which has a plurality of inversely spread circuits, for inversely spreading baseband signals which are spread-spectrum-modulated and transmitted by pseudo-noise codes of different timing in accordance with a plurality of inversely spread circuits, thereafter for combining the output from a plurality of inversely spread circuits, comprises the steps of: measuring the delay profile of the baseband signal, while changing the measuring time for measuring the delay profile representing the power level of the plural scattered waves which are received at different delay time, the delay profile being included in said baseband signal; and selecting a desired number of scattered waves among from the plural scattered waves included in the baseband signal based on the delay profile measured, and assigning respective reception timings of the selected scattered waves to corresponding plural inversely spread circuits so as to determine the timing of generating the pseudo-noise codes.

While changing the measuring time for measuring the delay profile of the baseband signal, the delay profile of the baseband signal is measured, so that the measuring time can be held down to the minimum time it is needed, with the degradation of the reception power level being avoided.

The nature, principle and utility of the invention will become more apparent from the following detailed description when read in conjunction with the accompanying drawings in which like parts are designated by the reference numerals or characters.

BRIED DESCRIPTION OF THE DRAWINGS

In the accompanying drawings:

FIGS. 1A to 1C are schematic diagrams explaining the principle of spread;

FIG. 2 is a schematic diagram explaining the multipath fading;

DETAILED DESCRIPTION OF THE EMBODIMENT

Figure 3:
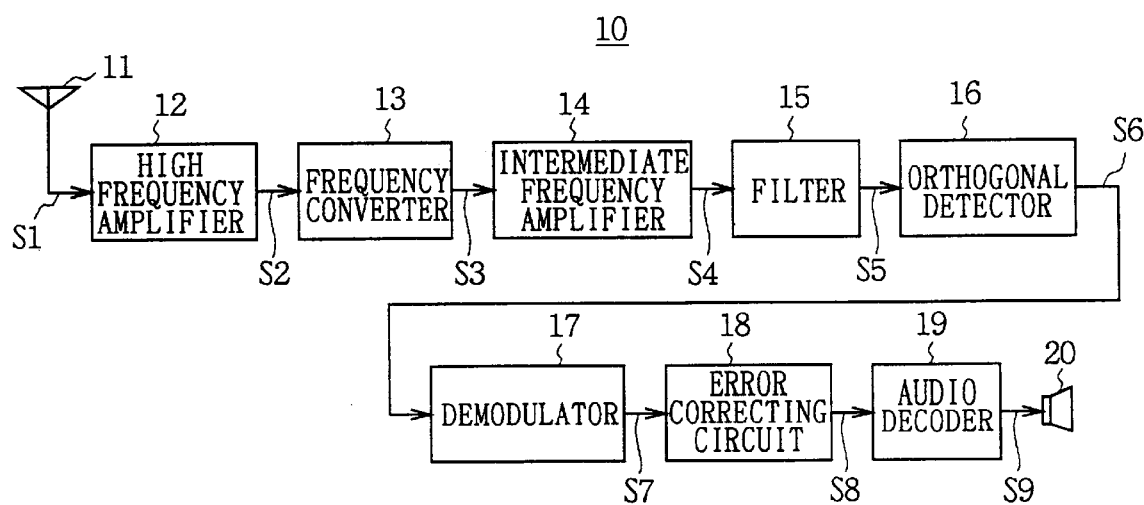
FIG. 3 is a block diagram showing a conventional RAKE receiver.
Figure 4:
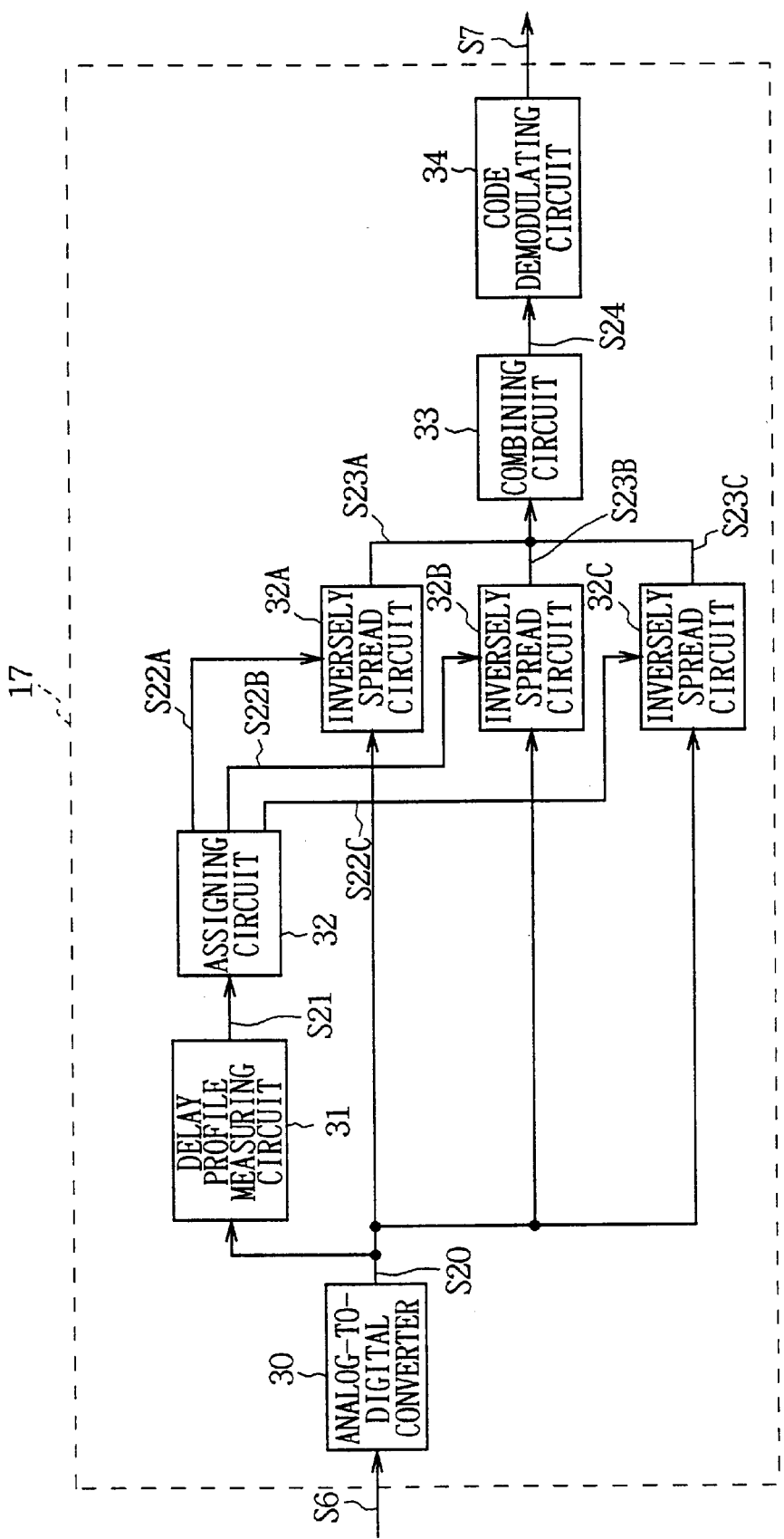
FIG. 4 is a block diagram showing the constitution of a conventional demodulator.
Figure 5:
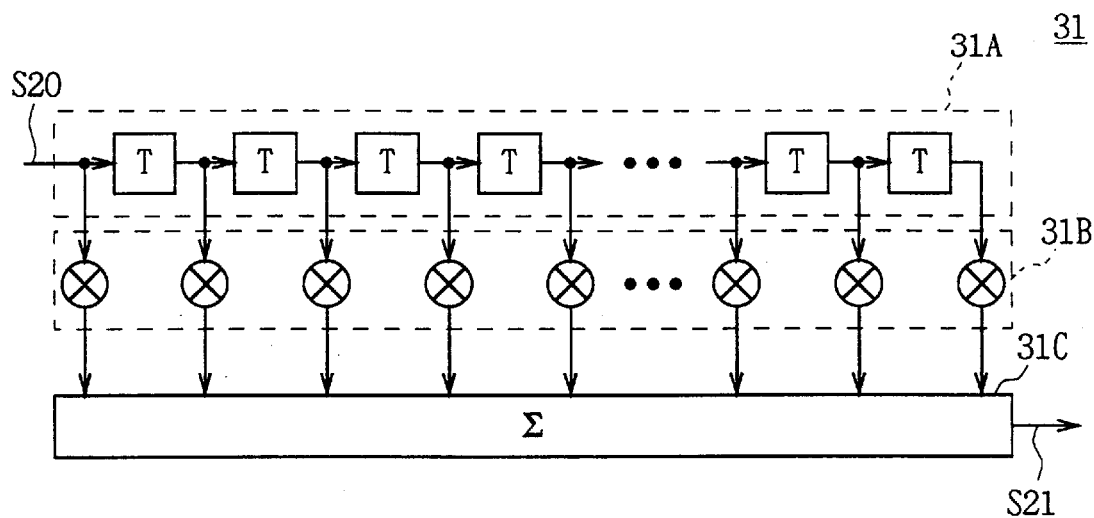
FIG. 5 is a block diagram showing the constitution of a delay profile measuring circuit.
Figure 6:
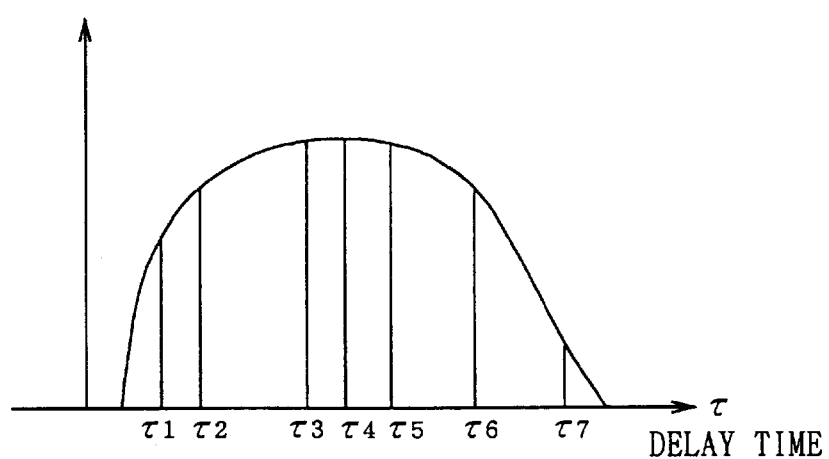
FIG. 6 is a table showing the delay profile.
Figure 7:
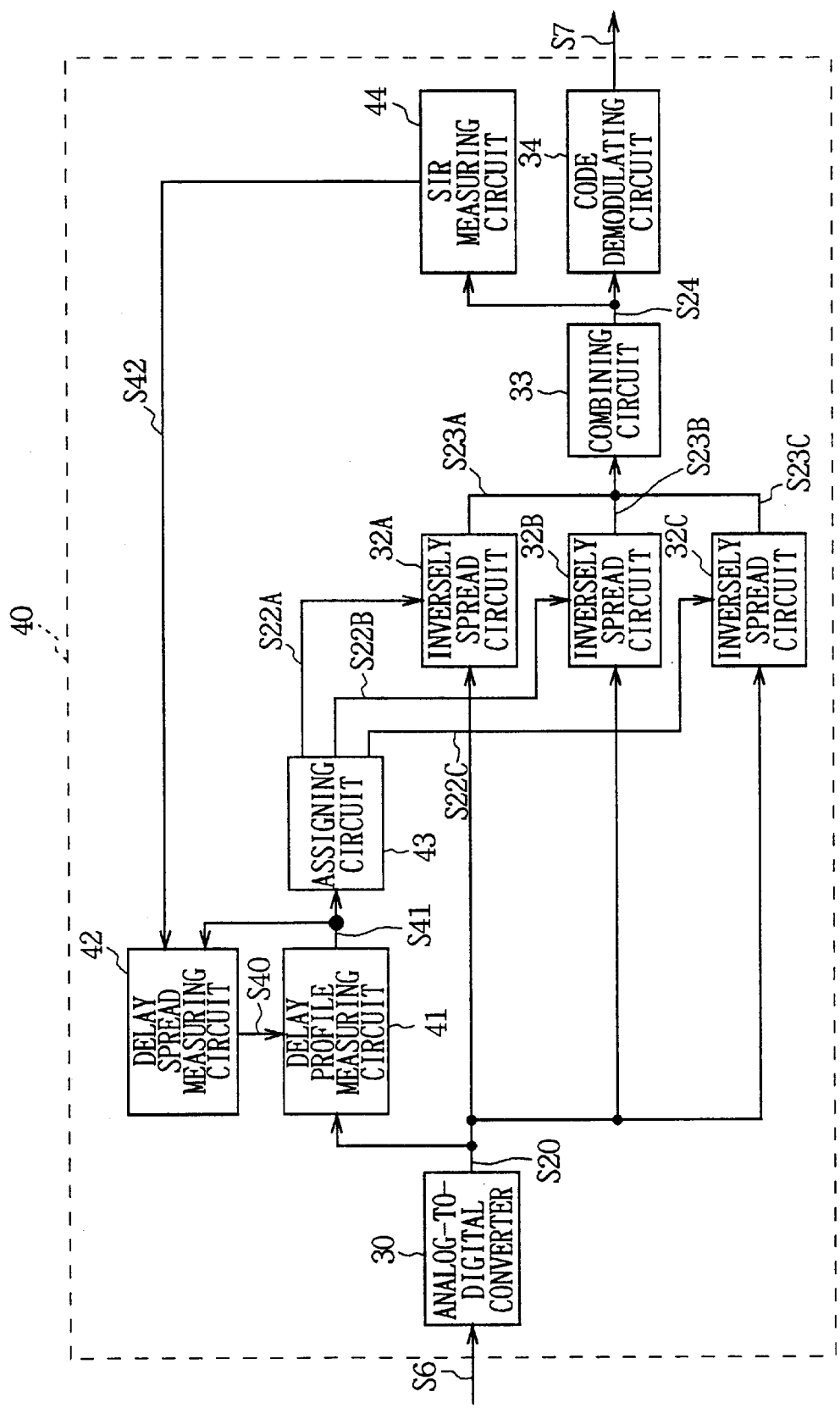
FIG. 7 is a block diagram showing the constitution of a demodulator according to the present invention.

Preferred embodiment of this invention will be described with reference to the accompanying drawings:

As shown in FIG. 7 where the portions corresponding to those of FIG. 4 are designated with the same symbols, a demodulator 40 divides a baseband signal S6 into a plurality of scattered waves each having a different delay time to inversely spread them, and then combines them. The demodulator 40 inputs the baseband signal S6 output from an orthogonal detector 16 (FIG. 3) to an analog-to-digital converter 30. The analog-to-digital converter 30 analog-to-digital converts the baseband signal S6 and outputs the resultant reception data S20 to a delay profile measuring circuit 41 and inversely spread circuits 32A to 32C.

Based on measuring time information S40 supplied from a delay spread measuring circuit 42, the delay profile measuring circuit 41 inversely spreads the scattered waves included in the period of time indicated by the measuring time information S40 among a plurality of scattered waves included in the reception data S20 one by one, and measures the power level. The delay profile measuring circuit 41 generates the delay profile S41 representing the power level distribution of scattered waves to the delay time, and outputs this to the delay spread measuring circuit 42 and an assigning circuit 43.

The delay spread measuring circuit 42 det ermines the next measuring time in the delay profile measuring circuit 41 in accordance with call quality information S42 supplied from a signal interference ratio (SIR) measuring circuit 44, and outputs this to the delay profile measuring circuit 41 as the measuring time information S40. The assigning circuit 43 selects a scattered wave one by one from the scattered wave having the highest power level among a plurality of scattered waves based on the delay profile S41 output from the delay profile measuring circuit 41, and outputs timing signals S22A to S22C showing the reception timings of the selected scattered waves to corresponding inversely spread circuits 32A to 32C.

Figure 8:
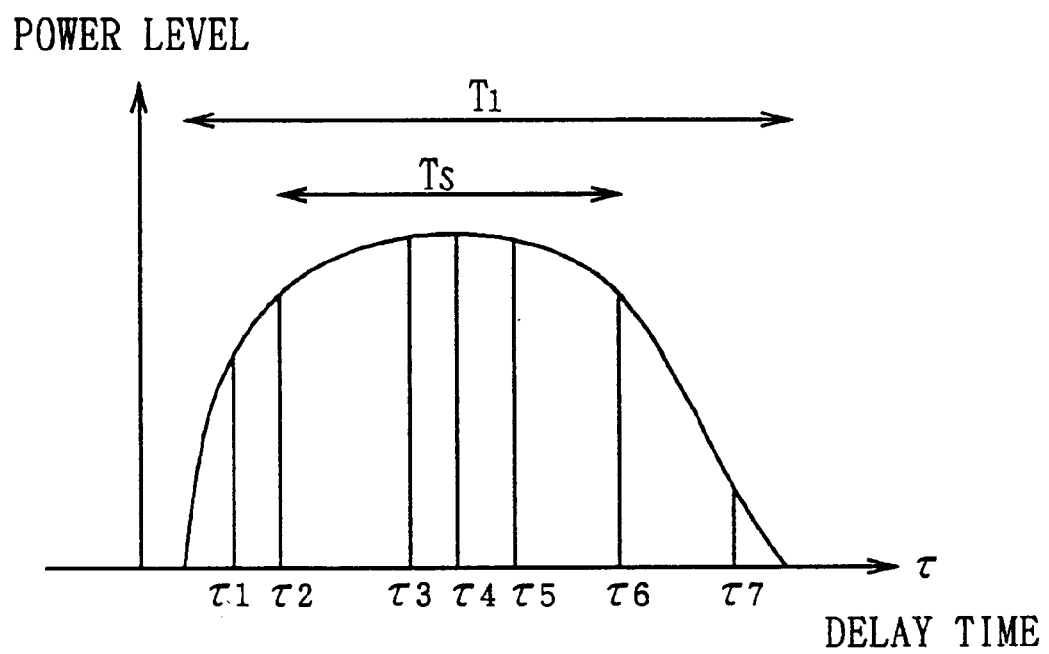
FIG. 8 is a table showing the delay profile.

For example, as shown in FIG. 8, the delay profile measuring circuit 41 measures the distribution of the power level of scattered waves to the delay times $\tau_1$ to $\tau_7$ in the range of the measuring time T1 which is set as a default value, to generate the delay profile S41, and outputs this to the delay spread measuring circuit 42 and the assigning circuit 43. The assigning circuit 43 then selects the scattered waves of the delay times $\tau_3$, $\tau_4$, and $\tau_5$ among the scattered waves of the delay times $\tau_1$ to $\tau_7$ based on the delay profile S41, and generates the timing signals S22A to S22C showing the reception timing.

On the other hand, the delay spread circuit 42 determines the second measuring time Ts from the delay profile S41 output from the delay profile measuring circuit 41, and outputs this to the delay profile measuring circuit 41 as measuring time information S40. The delay profile measuring circuit 41 starts to measure at a timing delayed by a predetermined time from the first measuring time, based on the measuring time information S40. After the measuring time Ts has passed, the measurement is terminated. At the third measuring time, the delay spread circuit 42 selects one of the measuring times T1 and Ts in accordance with the call quality information S42 supplied from the SIR measuring circuit 44, and outputs this to the delay profile measuring circuit 41 as measuring time information S40. After this, the above-described operation is repeated successively.

Returning to FIG. 7, the inversely spread circuit 32A generates a pseudo-noise code of a timing based on the timing signal S22A supplied from the assigning circuit 43, and inversely spreads the reception data S20 by using the pseudo-noise code. The inversely spread circuit 32A inversely spreads only the scattered wave based on the instruction of the assigning circuit 43 among a plurality of scattered waves, and outputs the resultant inversely spread data S23A to the combining circuit 33.

Similarly, the inversely spread circuits 32B and 32C respectively generate pseudo-noise codes of timings based on the timing signals S22B and S22C supplied from the assigning circuit 43, and inversely spread the reception data S20 by using the generated pseudo-noise codes. The inversely spread circuits 32B and 32C inversely spread only the scattered wave based on the instruction of the assigning circuit 43 among a plurality of scattered waves, and output the resultant inversely spread data S23B and S23C to the combining circuit 33.

The combining circuit 33 synchronizes the timing of the inversely spread data S23A to S23C, then combines the inversely spread data S23A to S23C by the maximum ratio combining method, and outputs the resultant combined data S24 to the SIR measuring circuit 44 and a code demodulating circuit 34. The SIR measuring circuit 44 obtains the current call quality γ from the combined data s24 to compare it to the call quality Γ which is desired by a receiver , and outputs the compared result to the delay spread measuring circuit 42 as the call quality information S42. Further, the code demodulating circuit 34 demodulates the combined data S24 based on a predetermined demodulating method, and outputs the resultant demodulated data S7 to the error correcting circuit 18 (FIG. 3) at a later stage.

In this connection, even if the delay profile is changed, the delay profile measuring circuit 41 can a ccept the change if the measuring time is intermittently extended. Generally, the period that the timing signals S22A to S22C are assigned to the inversely spread circuits 32A to 32C is several milliseconds to several tens milliseconds. On the other hand, the time that the delay profile changes is several hundreds milliseconds and over, and the change speed is late. In this way, the delay profile measuring circuit 41 can avoid the degradation of the reception power level only by extending the measuring time intermittently, so that the measuring time of the delay profile can be limited to the minimum with the degradation of the reception power level being avoided. Especially, since the delay profile is not changed when an user does not move, we can obtain the effect sufficiently.

Figure 9:
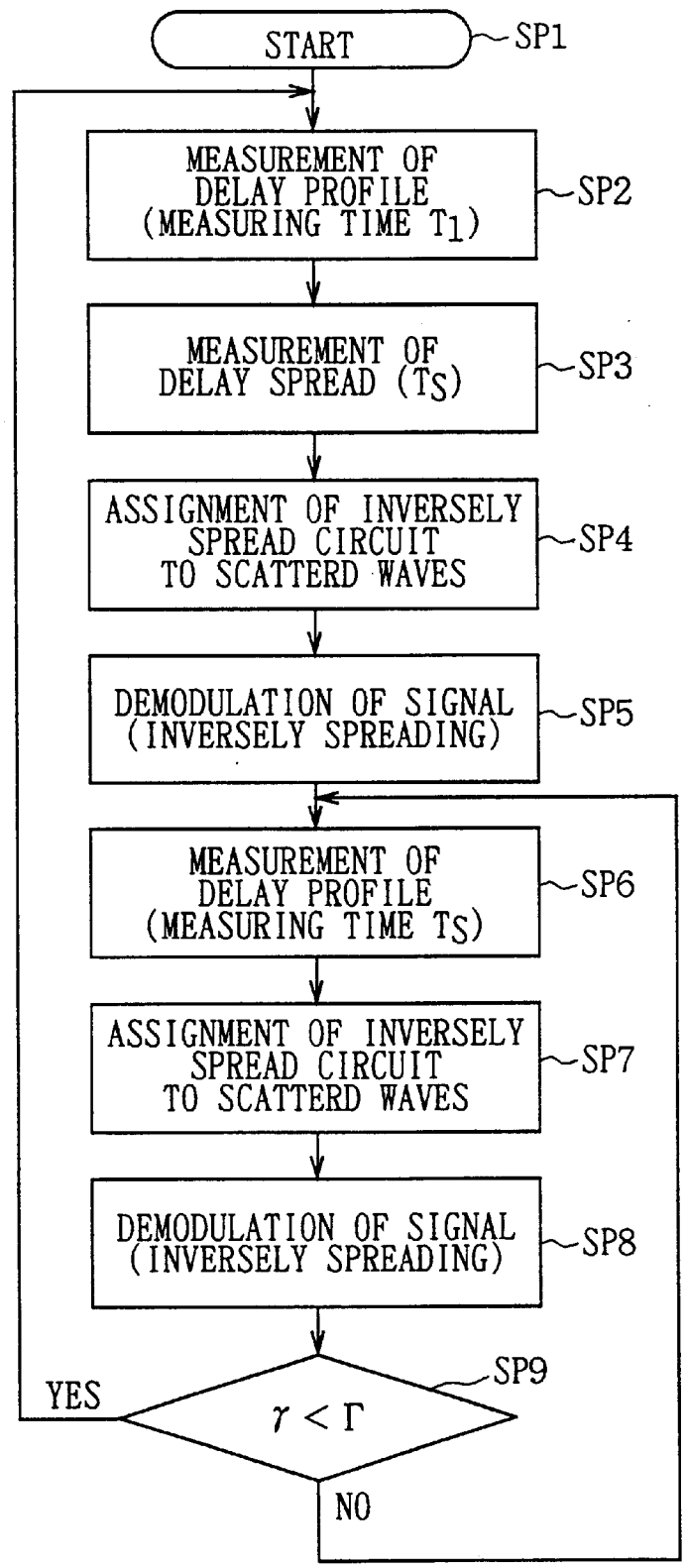
FIG. 9 is a flowchart showing a method of demodulation.

Here, the demodulating method of the reception data S20 will be explained using FIG. 9. At step SP2 entering from step SP1, the delay profile measuring circuit 41 measures the distribution of the power level of scattered waves to the delay time in the range of measuring time T1 which is set as a default value, so as to generate the delay profile S41, and outputs this to the delay spread measuring circuit 42 and the assigning circuit 43.

At step SP3, the delay spread circuit 42 obtains delay spread σ which is the standard deviation from the delay profile S41 output from the delay profile measuring circuit 41 by the following equation (9):

$$\sigma = \sqrt{\frac{1}{P}\int_0^\infty (\tau - m_\tau)^2 p(\tau) d\tau} \quad (9)$$

Note that "P" denotes the reception signal power, "p(r)" denotes the delay profile, and the average value "mτ" is calculated by the following equation (10):

$$m\tau = \frac{1}{P}\int_0^\infty \tau p(\tau) d\tau \quad (10)$$

Next, the delay spread circuit 42 uses the delay spread σ to calculate the second measuring time Ts by the following equation (11):

$$T_2 = 2\sigma\alpha$$

and the delay spread circuit 42 outputs this to the delay profile measuring circuit 41 as the measuring time information S40. Note that "α" is a constant which has been previously determined.

At step SP4, the assigning circuit 43 selects a scattered wave one by one from the scattered wave having the highest power level among a plurality of scattered waves, based on the delay profile S41. The assigning circuit 43 then outputs the timing signals S22A to S22c showing the timings of the selected scattered waves to corresponding inversely spread circuits 32A to 32C.

At step SP5, the inversely spread circuits 32A to 32C respectively generate the pseudo-noise codes of the timing based on the timing signals S22A to S22C, and inversely spread the reception data S20 by using the pseudo-noise codes, so as to inversely spread only the scattered wave based on the instruction of the assigning circuit 43 among a plurality of scattered waves and output the resultant inversely spread data S23A to S23C to the combining circuit 33. The combining circuit 33 combines the inversely spread data S23A to S23C by the maximum ratio combining method.

At step SP6, the delay profile measuring circuit 41 generates the delay profile S41 within the extent of the measuring time Ts based on the measuring time information S40 output from the delay spread circuit 42, and outputs this to the delay spread measuring circuit 4 2 and the assigning circuit 43. At step SP7, the assigning circuit 43 selects a desired scattered wave among a plurality of scattered waves based on the delay profile 541, and outputs the timing signals S22A to S22C showing the reception timing to corresponding inversely spread circuits 32A to 32C.

At step SP8, the inversely spread circuits 32A to 32C inversely spread the reception data S20 based on the timing signals S22A to S22C, so that only the desired scattered wave is respectively inversely spread among a plurality of scattered waves and the resultant inversely spread data S23A to S23C are output to the combining circuit 33. The combining circuit 33 combines the inversely spread data S23A to S23C and outputs the resultant combined data S24 to the SIR measuring circuit 44.

At step SP9, the SIR measuring circuit 44 obtains the current call quality γ from the combined data S24 to compare the current call quality γ to the call quality Γ which is desired by the receiver, and outputs the compared result to the delay spread circuit 42 as the call quality information S42. When the current call quality γ is inferior to the desired call quality Γ based on the call quality information S42, the delay spread circuit 42 proceeds to step SP2 to set the measuring time to T1. When the current call quality γ is superior to the desired call quality Γ, the delay spread circuit 42 proceeds to step SP6 to set the measuring time to Ts.

In the above construction, the delay profile measuring circuit 41, at the first measurement, measures the distribution of the power level of scattered waves to the delay time within the range of the measuring time T1 set as a default value so as to generate the delay profile S41, and outputs this to the delay spread measuring circuit 42. The delay spread measuring circuit 42 calculates the delay spread σ from the delay profile S41, and uses the delay spread σ to obtain the minimum measuring time Ts which is shorter than the first measuring time T1.

The delay profile measuring circuit 41, at the second measurement, measures the delay profile S41 within the range of the measuring time Ts calculated at the first measurement, and outputs this to the delay spread measuring circuit 42. The delay spread measuring circuit 42 judges the call quality based on the call quality information S42 supplied from the SIR measuring circuit 44, and continuously sets the measuring time to Ts at the third time when the call quality at this measurement is superior to the desired call quality, and on the contrary, sets the measuring time to a default value Ti again at the third time when the call quality at this time is inferior to the desired one. After the fourth time, the operation described above will be successively repeated.

In this way, the delay spread σ is calculated from the delay profile S41 and the delay spread σ is used to calculate the measuring time, so that the measuring time of the delay profile measuring circuit 41 can be held down to the minimum which does not affect the reception power level. Therefore, the power consumption of the delay profile measuring circuit 41 can be reduced significantly comparing to the case where the wide time range is measured as a conventional one, while holding the constant call quality. Since the delay profile measuring circuit 41 is driven even in a waiting time, the reduction of the power consumption of the delay profile measuring circuit 41 results in the reduction of the power consumption of the portable telephone entirely.

According to the construction described above, the delay spread σ is calculated from the delay profile S41 and the delay spread σ is used to calculate the measuring time, so that the measuring time can be held down to the minimum while avoiding the degradation of the reception power level. Thereby, the power consumption can be reduced extremely comparing to the conventional one without the degradation of the call quality (i.e., reception quality).

Figure 10:
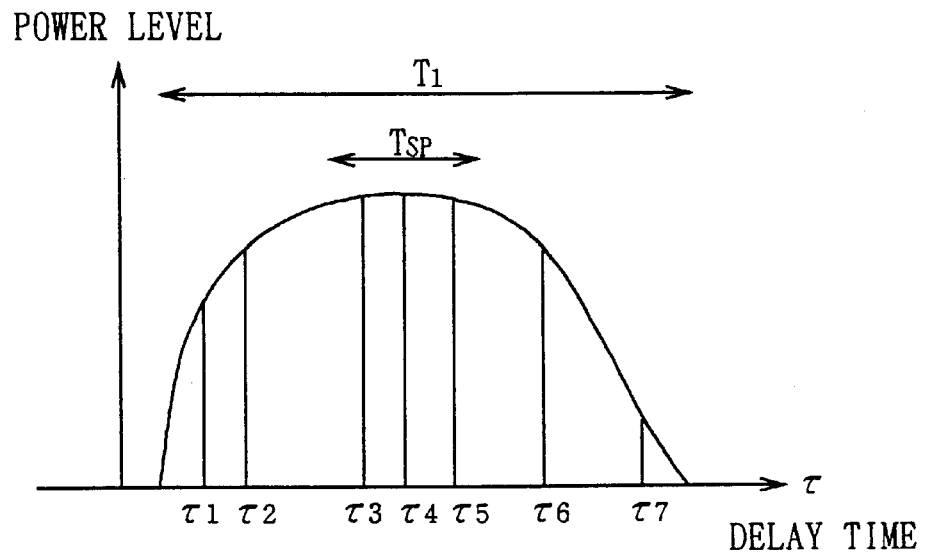
FIG. 10 is a table showing the delay profile according to other embodiment.

The above described embodiment has been dealt with a case where the delay spread σ is calculated from the delay profile S41 and the delay spread σ is used to calculate the measuring time. However, the present invention is not limited to this, but as shown in FIG. 10, after a scattered wave having the maximum power level is selected among a plurality of scattered waves measured within the measuring time T1 and a desired number of waves before and after the scattered wave are selected, if the time range including the selected scattered waves is set to the measuring time $T_{SP}$, the same effect as described above can be also obtained.

Figure 11:
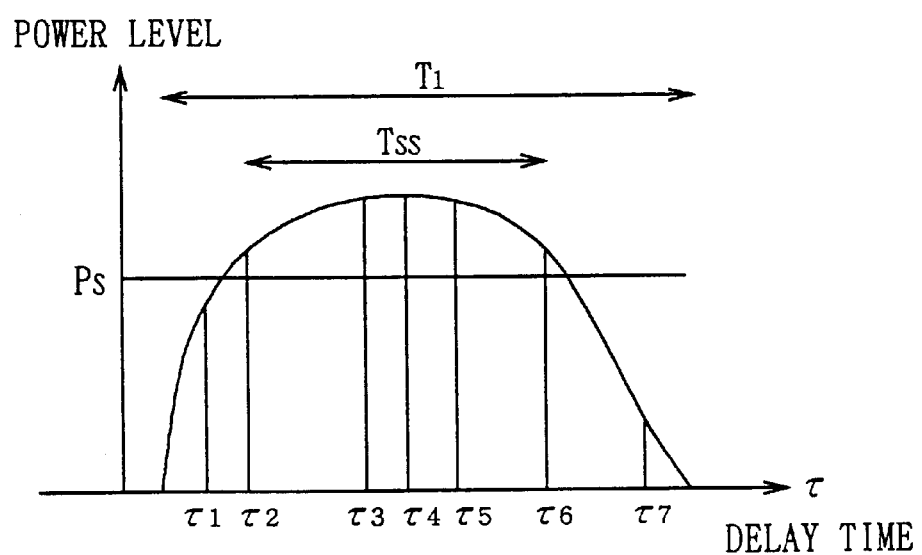
FIG. 11 is a table showing the delay profile according to other embodiment.

Further, the embodiment described above has been dealt with a case where the delay spread σ is calculated from the delay profile S41 and the delay spread σ is used to calculate the measuring time. However, the present invention is not limited to this, but as shown in FIG. 11, if the power level for securing the minimum call quality it is needed being is set as the threshold value $P_S$ and the time range including the scattered waves having the power level exceeding the threshold value $P_S$ is set to the measuring time $T_{SS}$, the same effect as described above can be also obtained.

Further, the embodiment described above has been dealt with a case where the delay spread σ is calculated from the delay profile S41 and the delay spread σ is used to calculate the measuring time. However, the present invention is not limited to this, but, after the power level for securing the minimum call quality it is needed is set as the threshold value and a desired number of scattered waves are selected in order of the highest power level, if the time range including the selected scattered waves is set to the measuring time, the same effect as described above can be also obtained.

Further, the embodiment described above has been dealt with a case where the electrical power distribution of scattered waves to the delay time is measured. However, the present invention is not limited to this, but it is regarded that the scattered waves are not delayed when the delay spread σ is a predetermined value (e.g., values under one chip of the spread code sequence), and only scattered wave having the highest power level can be inversely spread among respective scattered waves.

Further, the above described embodiment has been dealt with a case where the measuring time is shortened in accordance with the reception quality. However, the present invention is not limited to this, but, after the measuring time is set widely when a desired reception quality can not be secured, if the delay profile is measured again, the same effect as described above can be also obtained.

Further, the above described embodiment has been dealt with a case where the measuring profile S41 is measured within the measuring time based on the measuring time information S40 supplied from the delay spread circuit 42. However, the present invention is not limited to this, but in short, the delay profile may be measured, changing the measuring time.

Further, the above described embodiment has been dealt with a case where the current call quality γ is compared to the desired call quality Γ, and the measuring time is set to a default value Ti when the current call quality γ is inferior to the desired call quality Γ, and the current measuring time Ts is used as it is when the current call quality γ is superior to the desired call quality Γ. However, the present invention is not limited to this, but the measuring time is set to be extended when the current reception quality is inferior to the minimum reception quality it is needed, and the measuring time is set to the same period or to be shortened when the current reception quality is superior to the minimum reception quality it is needed.

While this has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A demodulating apparatus, which has a plurality of inversely spread circuits, for inversely spreading baseband signals which are spread-spectrum-modulated and transmitted along with pseudo-noise codes with different timing in accordance with said plurality of inversely spread circuits, for combining an output from said plurality of inversely spread circuits, comprising:

delay profile measuring means for measuring a delay profile of said baseband signal, while changing a measuring time for measuring said delay profile, where said delay profile represents a power level of a plurality of scattered waves received at different delay times, said delay profile being included in said baseband signal; and assigning means for selecting a desired number of scattered waves from among said plurality of scattered waves included in said baseband signal based on said delay profile measured by said delay profile measuring means, and for assigning respective reception timings of said selected scattered waves to said corresponding plurality of inversely spread circuits to determine a timing for the generation of said pseudo-noise codes.

2. The demodulating apparatus according to claim 1, comprising delay spread measuring means for calculating a delay spread which is the standard deviation of said delay profile to determine said measuring time based on said delay spread, wherein said assigning means selects a scattered wave with the highest power level from among said plurality of scattered waves included in said baseband signal.

3. The demodulating apparatus according to claim 2, comprising reception quality measuring means for measuring a current reception quality based on a combined result of said outputs from said plurality of inversely spread circuits and for comparing said current reception quality to a minimum reception quality, wherein said delay spread measuring means increases said measuring time when said current reception quality is lower than said minimum reception quality based on a compared result output from said reception quality measuring means, and sets said measuring time to one of a same time and a decreased time when said current reception quality is greater than said minimum reception quality.

4. The demodulating apparatus according to claim 1, wherein:

said delay profile measuring means measures said delay profile of said baseband signal based on said measuring time supplied from said assigning means; and said assigning means selects at least one scattered wave with the highest power level from among said plurality of scattered waves included in said baseband signal based on said delay profile measured by said delay profile measuring means, and sets a time range to include said selected scattered waves in said measuring time to provide said measuring time to said delay profile measuring means.

5. The demodulating apparatus according to claim 4, comprising reception quality measuring means for measuring a current reception quality based on a combined result of said outputs from said plurality of inversely spread circuits and for comparing said current reception quality to a minimum reception quality, wherein said delay profile measuring means increases said measuring time when said current reception quality is lower than said minimum reception quality based on a compared result output from said reception quality measuring means, and sets said measuring time to one of a same time and a decreased time when than said current reception quality is greater than said minimum reception quality.

6. The demodulating apparatus according to claim 1, wherein:

delay profile measuring means measures said delay profile of said baseband signal based on said measuring time supplied from said assigning means; and assigning means selects a scattered wave having a power level sufficient to secure a minimum reception quality from among said plurality of scattered waves included in said baseband signal based on said delay profile measured by said delay profile measuring means, and sets a time range to include said selected scattered waves in said measuring time to provide said measuring time to said delay profile measuring means.

7. The demodulating apparatus according to claim 6, comprising reception quality measuring means for measuring a current reception quality based on a combined result of said outputs from said plurality of inversely spread circuits and for comparing said current reception quality to a minimum reception quality, wherein said delay profile measuring means increases said measuring time when said current reception quality is lower than said minimum reception quality based on a compared result output from said reception quality measuring means, and sets said measuring time to one of a same time and a decreased time when said current reception quality is greater than said minimum reception quality.

8. The demodulating apparatus according to claim 1, wherein:

said delay profile measuring means measures said delay profile of said baseband signal based on said measuring time supplied from said assigning means; and said assigning means selects a desired number of said scattered waves of the highest power levels from among said scattered waves having power levels sufficient to secure a minimum reception quality, and sets a time range to include said selected scattered waves in said measuring time and provides said measuring time to said delay profile measuring means.

9. The demodulating apparatus according to claim 8, comprising reception quality measuring means for measuring a current reception quality based on a combined result of said outputs from said plurality of inversely spread circuits and for comparing said current reception quality to a minimum reception quality, wherein said delay profile measuring means increases said measuring time when said current reception quality is lower than said minimum reception quality based on a compared result output from said reception quality measuring means, and sets said measuring time to one of a same time and a decreased time when said current reception quality is greater than said minimum reception quality.

10. A demodulating method performed by a demodulating apparatus, which has a plurality of inversely spread circuits, for inversely spreading baseband signals which are spread-spectrum-modulated and transmitted along with pseudo-noise codes with different timing in accordance with said plurality of inversely spread circuits, for combining an output from said plurality of inversely spread circuits, comprising the steps of:

measuring a delay profile of said baseband signal, while changing a measuring time for measuring said delay profile, said delay profile representing a power level of a plurality of scattered waves which are received at different delay times, said delay profile being included in said baseband signal; and selecting a desired number of said scattered waves from among said plurality of scattered waves included in said baseband signal based on said delay profile measured, and assigning respective reception timings of said selected scattered waves to said corresponding plurality of inversely spread circuits so as to determine timing for the generation of said pseudo-noise codes.

11. The demodulating method according to claim 10, comprising the steps of:

calculating a delay spread which is the standard deviation of said delay profile to determine said measuring time based on said delay spread;

measuring said delay profile of said baseband signal based on said measuring time; and selecting at least one scattered wave with the highest power level from among said plurality of scattered waves included in said baseband signal based on said delay profile.

12. The demodulating method according to claim 11, comprising the steps of:

measuring a current reception quality based on a combined result of said outputs from said plurality of inversely spread circuits and comparing said current reception quality to a minimum reception quality; and based on a compared result, increasing said measuring time when the current reception quality is lower than said minimum reception quality, and setting said measuring time to one of a same time when said current reception quality is greater than said minimum reception quality.

13. The demodulating method according to claim 10, comprising the steps of:

selecting at least one scattered wave with the highest power level from among said plurality of scattered waves included in said baseband signal based on said delay profile measured; setting a time range to include said selected scattered waves in said measuring time; and measuring said delay profile of said baseband signal based on said measuring time.

14. The demodulating method according to claim 13, comprising the steps of:

measuring a current reception quality based on a combined result of said outputs from said plurality of inversely spread circuits and comparing said current reception quality to a minimum reception quality; and based on a compared result, increasing said measuring time when said current reception quality is lower than said minimum reception quality, and setting said measuring time to one of a same time and a decreased time when said current reception quality is greater than said minimum reception quality.

15. The demodulating method according to claim 10, comprising the steps of:

selecting at least one scattered wave having a power level sufficient to secure a minimum call quality from among said plurality of scattered waves included in said baseband signal based on said delay profile measured; setting a time range to include said selected scattered waves in said measuring time; and measuring said delay profile of said baseband signal based on said measuring time.

16. The demodulating method according to claim 15, comprising the steps of:

measuring a current reception quality based on a combined result of said outputs from said plurality of inversely spread circuits and comparing said current reception quality to said minimum reception quality; and based on a compared result, increasing said measuring time when said current reception quality is lower than said minimum reception quality; and setting said measuring time to one of a same time and a decreased time when said current reception quality is greater than said minimum reception quality.

17. The demodulating method according to claim 10, comprising the steps of:

selecting a desired number of said scattered waves of the highest power levels from among said scattered waves having power levels sufficient to secure a minimum reception quality; setting the time range to include said selected scattered waves in said measuring time; and measuring said delay profile of said baseband signal based on said measuring time.

18. The demodulating method according to claim 17, comprising the steps of:

measuring a current reception quality based on a combined result of said outputs from said plurality of inversely spread circuits and comparing said current reception quality to a minimum reception quality; and based on a compared result, increasing said measuring time when said current reception quality is lower than said minimum reception quality; and setting said measuring time to one of a same time and a decreased time when said current reception quality is greater than said minimum reception quality.

* * * * *